United States Patent
Nishimoto et al.

(10) Patent No.: US 10,892,676 B2
(45) Date of Patent: Jan. 12, 2021

(54) POWER SUPPLY CIRCUIT FOR GENERATING A PREDETERMINED VOLTAGE AND A PREDETERMINED CURRENT

(71) Applicant: Panasonic Intellectual Property Management Co., Ltd., Osaka (JP)

(72) Inventors: Taiki Nishimoto, Osaka (JP); Noriaki Takeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/608,688

(22) PCT Filed: Apr. 26, 2018

(86) PCT No.: PCT/JP2018/016967
§ 371 (c)(1),
(2) Date: Oct. 25, 2019

(87) PCT Pub. No.: WO2018/199227
PCT Pub. Date: Nov. 1, 2018

(65) Prior Publication Data
US 2020/0144903 A1    May 7, 2020

(30) Foreign Application Priority Data

Apr. 28, 2017   (JP) .................... 2017-090152

(51) Int. Cl.
*H02M 1/14*   (2006.01)
*H02M 1/42*   (2007.01)
(Continued)

(52) U.S. Cl.
CPC ........... *H02M 1/14* (2013.01); *H02M 1/4208* (2013.01); *H02M 2001/0009* (2013.01)

(58) Field of Classification Search
CPC ................. H02M 1/14; H02M 1/4208; H02M 2001/0009; H02M 2001/0064;
(Continued)

(56) References Cited

U.S. PATENT DOCUMENTS 4,384,321 A   5/1983   Rippel
6,084,790 A * 7/2000   Wong ................. H02M 3/1584
                                                      323/272
(Continued)

FOREIGN PATENT DOCUMENTS

| JP | 2005-086958 A | 3/2005 |
| JP | 2007-195282 A | 8/2007 |
| JP | WO2018199223 | * 4/2018 |

OTHER PUBLICATIONS

International Search Report issued in corresponding International Patent Application No. PCT/JP2018/016967, dated Jun. 26, 2018, with English translation.

(Continued)

*Primary Examiner* — Thienvu V Tran
*Assistant Examiner* — Sisay G Tiku
(74) *Attorney, Agent, or Firm* — McDermott Will & Emery LLP (57) ABSTRACT

Provided is a power supply circuit in which a first input terminal is connected to a first end of a first reactor, the first input terminal is connected to a first end of a second reactor, a first end of a first inductor is connected the first input terminal, a second end of the first inductor is connected to a first end of a second inductor, a second end of the second inductor is connected to a first end of a bypass capacitor, a second end of the bypass capacitor is connected to a second output terminal, the first reactor and the first inductor are magnetically coupled to each other, the second reactor and the second inductor are magnetically coupled to each other, (Continued)

and a control circuit performs switching control over first and second switching elements, using an interleaving method.

4 Claims, 10 Drawing Sheets

(51) Int. Cl.
    *H02M 1/00*           (2006.01)
    *H02M 3/155*         (2006.01)
    *H02M 3/158*         (2006.01)

(58) Field of Classification Search
    CPC .. H02M 1/4225; H02M 3/158; H02M 3/1584; H02M 2003/1586; H02M 7/12
    See application file for complete search history.

(56) References Cited

U.S. PATENT DOCUMENTS

| | | | | |
|---|---|---|---|---|
| 7,151,364 | B2* | 12/2006 | Kimura | H02M 3/1584 323/282 |
| 7,602,165 | B2* | 10/2009 | Watanabe | H02M 3/1584 323/272 |
| 8,513,932 | B2* | 8/2013 | Yang | H02M 3/1584 323/282 |
| 9,912,229 | B2* | 3/2018 | Choudhury | H02M 1/4208 |
| 2005/0226015 | A1* | 10/2005 | Tsuruya | H02M 1/4225 363/89 |
| 2007/0076343 | A1* | 4/2007 | Terada | H03H 7/0107 361/111 |
| 2007/0262752 | A1* | 11/2007 | Gaikwad | G05F 1/70 323/207 |
| 2011/0188273 | A1* | 8/2011 | Pansier | H02M 1/4225 363/44 |
| 2012/0039094 | A1* | 2/2012 | Shin | H02M 1/4225 363/21.04 |
| 2016/0315552 | A1* | 10/2016 | Nishimoto | H02M 1/126 |
| 2016/0373001 | A1* | 12/2016 | Liu | H02M 3/158 |
| 2019/0348918 | A1* | 11/2019 | Ojika | H02M 1/14 |
| 2020/0144905 | A1* | 5/2020 | Takeda | H02M 1/4208 |

OTHER PUBLICATIONS

Extended European Search Report dated Mar. 26, 2020 in European Application No. 18790129.3.

* cited by examiner

POWER SUPPLY CIRCUIT FOR GENERATING A PREDETERMINED VOLTAGE AND A PREDETERMINED CURRENT

CROSS-REFERENCE OF RELATED APPLICATIONS

This application is the U.S. National Phase under 35 U.S.C. § 371 of International Patent Application No. PCT/JP2018/016967, filed on Apr. 26, 2018, which in turn claims the benefit of Japanese Application No. 2017-090152, filed on Apr. 28, 2017, the entire disclosures of which Applications are incorporated by reference herein.

TECHNICAL FIELD

The present disclosure relates to a power supply circuit that generates a predetermined voltage and a predetermined current.

BACKGROUND ART

Patent Literature 1 discloses a power supply device that reduces ripple components constituting a noise, by performing switching control using an interleaving method.

In the conventional technique, there is a demand to further reduce noises with frequencies equal to an even multiple of a switching frequency.

CITATION LIST

Patent Literature

Patent Literature 1: JP 2007-195282 A

SUMMARY OF INVENTION

A power supply circuit according to one aspect of the present disclosure includes a first input terminal ($3a$); a second input terminal ($3b$); a first reactor (Lr1); a second reactor (Lr2); a first switching element (Sw1); a second switching element (Sw2); a third switching element (S1); a fourth switching element (S2); a first capacitor (C1); a first output terminal ($5a$); a second output terminal ($5b$); a control circuit (9); a first inductor (Lc1); a second inductor (Lc2); and a bypass capacitor (Cb1). In the power supply circuit, the first input terminal ($3a$) is connected to a first end of the first reactor (Lr1), a second end of the first reactor (Lr1) is connected to a first end of the third switching element (S1), and a second end of the third switching element (S1) is connected to the first output terminal ($5a$), the first input terminal ($3a$) is connected to a first end of the second reactor (Lr2), a second end of the second reactor (Lr2) is connected to a first end of the fourth switching element (S2), and a second end of the fourth switching element (S2) is connected to the first output terminal ($5a$), the second input terminal ($3b$) is connected to the second output terminal ($5b$), a first end of the first switching element (Sw1) is connected to the second end of the first reactor (Lr1), and a second end of the first switching element (Sw1) is connected to the second output terminal ($5b$), a first end of the second switching element (Sw2) is connected to the second end of the second reactor (Lr2), and a second end of the second switching element (Sw2) is connected to the second output terminal ($5b$), a first end of the first capacitor (C1) is connected to the first output terminal ($5a$), and a second end of the first capacitor (C1) is connected to the second output terminal ($5b$), a first end of the first inductor (Lc1) is connected to the first input terminal ($3a$), a second end of the first inductor (Lc1) is connected to a first end of the second inductor (Lc2), a second end of the second inductor (Lc2) is connected to a first end of the bypass capacitor (Cb1), and a second end of the bypass capacitor (Cb1) is connected to the second output terminal ($5b$), the first reactor (Lr1) and the first inductor (Lc1) are magnetically coupled to each other, and the second reactor (Lr2) and the second inductor (Lc2) are magnetically coupled to each other, and the control circuit (9) performs switching control over the first switching element (Sw1) and the second switching element (Sw2), using an interleaving method.

According to the present disclosure, noises with frequencies equal to an even multiple of a switching frequency can be further reduced.

DESCRIPTION OF EMBODIMENTS

Knowledge Underlying the Present Disclosure

Figure 6:
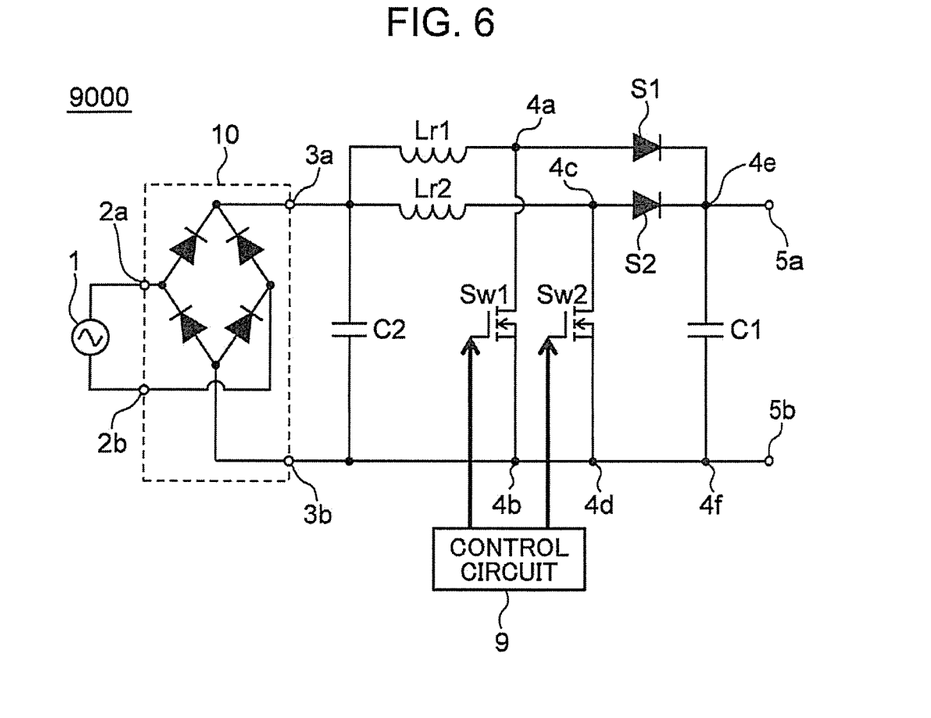
FIG. 6 is a circuit diagram showing a schematic configuration of a power factor improving circuit of a comparative example which performs switching control using an interleaving method.

Knowledge underlying the present disclosure will first be described. FIG. 6 is a circuit diagram showing a schematic configuration of a power factor improving circuit 9000 of a comparative example which performs switching control using an interleaving method. The power factor improving circuit 9000 shown FIG. 6 that performs switching control, using the interleaving method, similarly to the power supply device disclosed in Patent Literature 1 has been conventionally known.

Specifically, in the power factor improving circuit 9000, an AC voltage from an AC power supply 1 is applied across a first input end 2a and a second input end 2b of a rectifying section 10. The applied AC voltage is rectified by the rectifying section 10 into a DC voltage, which is then applied across a first input terminal 3a and a second input terminal 3b.

A first switching element Sw1 and a second switching element Sw2 are subjected to switching control by a control circuit 9 using the interleaving method. Specifically, under such switching control, the first switching element Sw1 and the second switching element Sw2 are switched on and off at the same switching frequency (which will hereinafter be referred to as switching frequency fsw) such that the first switching element Sw1 and the second switching element Sw2 are different in phase by 180 degrees from each other.

A third switching element S1 is switched off when the first switching element Sw1 is switched on, and is switched on when the first switching element Sw1 is switched off. Likewise, a fourth switching element S2 is switched off when the second switching element Sw2 is switched on, and is switched on when the second switching element Sw2 is switched off. Hereinafter, operations of the first and second switching elements Sw1 and Sw2 under the switching control by the control circuit 9 using the interleaving method will be referred to as interleaving operations.

When the first switching element Sw1 is on, current energy is accumulated at a first reactor Lr1. When the third switching element S1 is on, current energy is transferred from the first reactor Lr1 to a first capacitor C1. When the second switching element Sw2 is on, current energy is accumulated at a second reactor Lr2. When the fourth switching element S2 is on, current energy is transferred from the second reactor Lr2 to the first capacitor C1. As a result of these actions, a DC voltage develops between a first output terminal 5a and a second output terminal 5b of the power factor improving circuit 9000.

The first reactor Lr1 and the second reactor Lr2 accumulate and release current energy repeatedly. As a result, currents flowing through the first reactor Lr1 and the second reactor Lr2 take waveforms having large triangular-wave-shaped ripples. These triangular-wave-shaped ripples propagate as a noise to, for example, the AC power supply 1 or the like.

Based on its propagation characteristics, a noise is classified into a normal mode noise and a common mode noise. A normal mode noise is a noise that circulates through a power line loop. A common mode noise is a noise that propagates through a plurality of power lines at the same phase and returns to the power supply by propagating through a neutral line at the phase reverse to the same phase. Triangular-wave-shaped ripples propagate as a normal mode noise.

Figure 7:
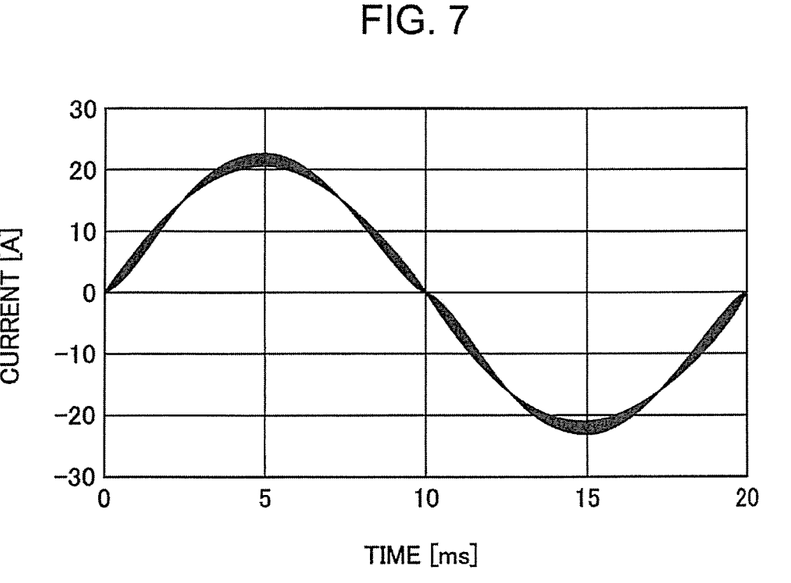
FIG. 7 is a graph showing a calculation result obtained by a circuit simulation of a power current in the power factor improving circuit shown in FIG. 6.

FIG. 7 is a graph showing a calculation result obtained by a circuit simulation of a power current in the power factor improving circuit 9000. A segment of a power current waveform shown in FIG. 7, the segment in a period from time 5 ms to time 5.1 ms, is extracted and is shown in an enlarged form in FIG. 8.

Figure 8:
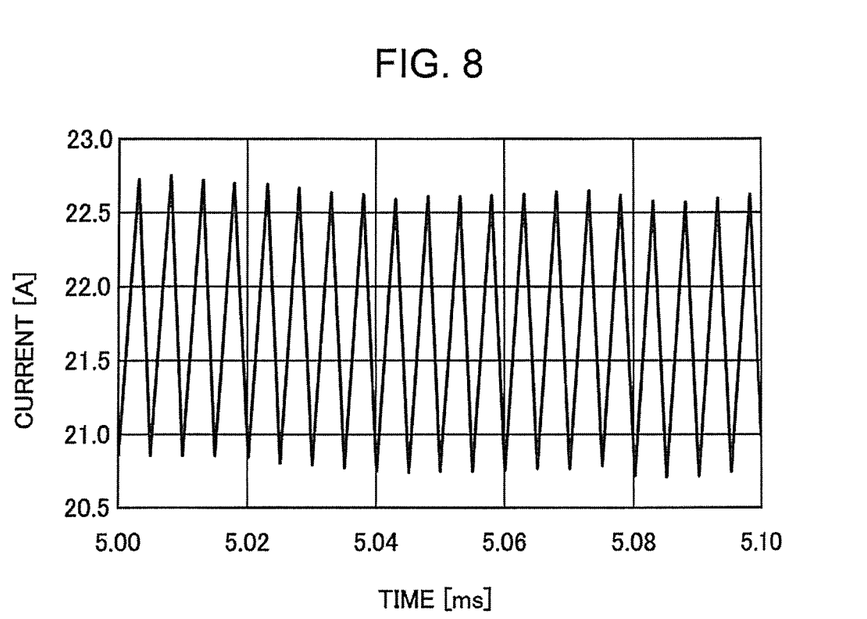
FIG. 8 is a graph showing an enlarged view of a segment of a power current waveform shown in FIG. 7, the segment being in a specific period.

In the circuit simulation, the inductance of the first reactor Lr1 and of the second reactor Lr2 is determined to be 200 uH. The capacitance of an X-capacitor C2 is determined to be 400 nF. The switching frequency fsw is determined to 100 kHz. The frequency and the effective value of the AC voltage supplied from the AC power supply I are determined to be 50 Hz and 200 V, respectively. The DC voltage that develops between the first output terminal 5a and the second output terminal 5b is determined to be 400 V.

According to the power factor improving circuit 9000, out of frequency components included in the generated triangle-wave-shaped ripples, frequency components equal to odd multiples of (one time, three times, . . . ) the switching frequency fsw are canceled out by interleaving operations. According to the power factor improving circuit 9000, however, frequency components equal to even multiples of (two times, four times, . . . ) the switching frequency fsw are not canceled out. As a result, as shown in FIGS. 7 and 8, the power current has a waveform of a sine wave having noises superimposed thereon.

To suppress a noise propagating to the power supply, a noise filter circuit may be provided between the power supply 1 and the rectifying section 10. This, however, raises a concern that the size of the power factor improving circuit 9000 may increase. Due to circuit layout requirements, the noise filter circuit may be mounted on a board separated from the power factor improving circuit 9000. This may raise a concern that a physical range in which a normal mode noise propagates becomes larger. As a result, a noise may enter a detection circuit used for circuit control, posing a high risk of causing circuit malfunctioning. Another problem may arise in a case where a normal mode noise is transformed into a common mode noise in a noise propagation path. In this case, the noise propagation path becomes complicated, leading to difficulty in carrying out noise preventing measures.

Figure 9:
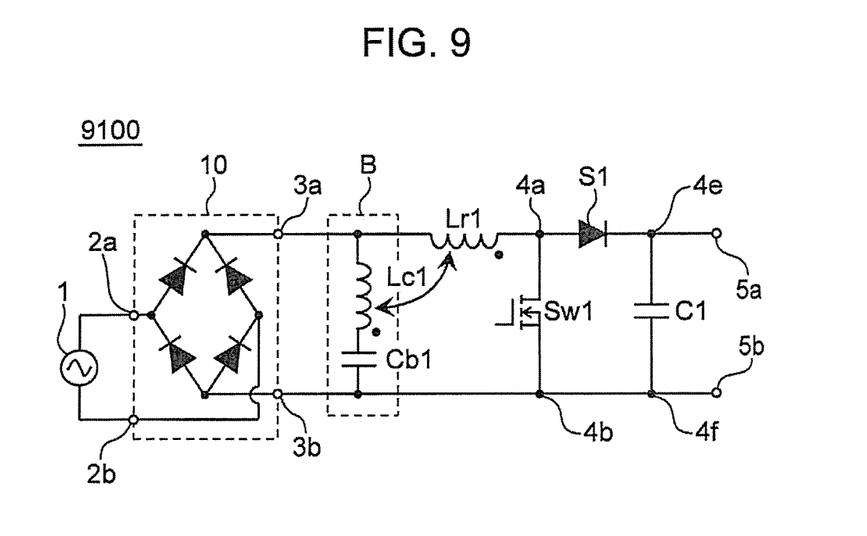
FIG. 9 is a circuit diagram showing a schematic configuration of a power factor improving circuit provided as another comparative example different from the power factor improving circuit shown in FIG. 6.
Figure 10:
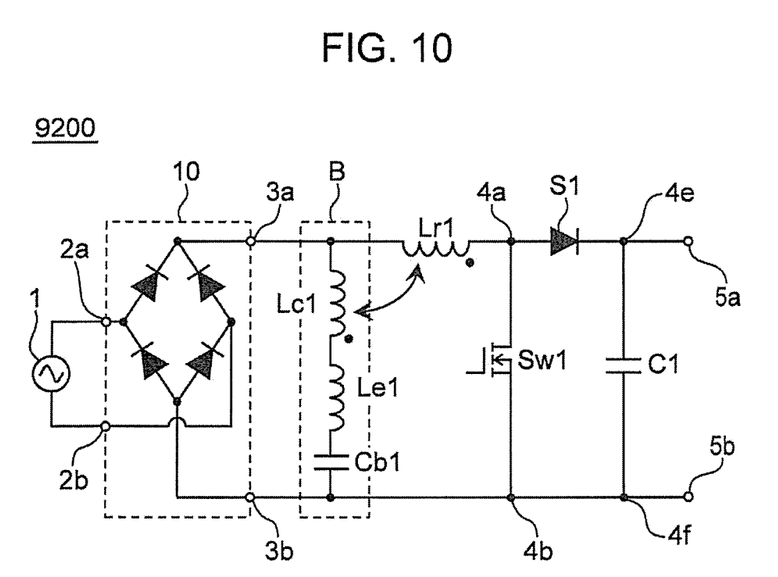
FIG. 10 is a circuit diagram showing a schematic configuration of a power factor improving circuit provided as still another comparative example different from the power factor improving circuits shown in FIGS. 6 and 9.

Meanwhile, power factor improving circuits 9100 and 9200 have been known as conventional power factor improving circuits that do not perform switching control using the interleaving method but reduce a normal mode noise with a frequency equal to the switching frequency fsw by a bypass circuit B, as shown in FIGS. 9 and 10. FIG. 9 is a circuit diagram showing a schematic configuration of the power factor improving circuit 9100 provided as another comparative example different from the power factor improving circuit 9000 shown in FIG. 6. FIG. 10 is a circuit diagram showing a schematic configuration of the power factor improving circuit 9200 provided as still another comparative example different from the power factor improving circuits 9000 and 9100 shown in FIGS. 6 and 9.

Specifically, as shown in FIGS. 9 and 10, the power factor improving circuits 9100 and 9200 each include the bypass circuit B having both ends connected respectively to the first input terminal 3a and the second input terminal 3b. The bypass circuit B has a first inductor Lc1 magnetically coupled to the first reactor Lr1, and a bypass capacitor Cb1 connected in series to the first inductor Lc1. The bypass circuit B included in the power factor improving circuit 9200 (FIG. 10) has a bypass inductor Le1 disposed between the first inductor Lc1 and the bypass capacitor Cb1.

In the power factor improving circuits 9100 and 9200, because the first reactor Lr1 and the first inductor Le1 are magnetically coupled to each other, a current flowing through the first reactor Lr1 excites a voltage across both terminals of the bypass capacitor Cb1, causing the voltage to oscillate. Hence part of a ripple component included in the current flowing through the first reactor Lr1 is supplied from the bypass circuit B.

As a result, part of a ripple component included in a current flowing through at least one of the first reactor Lr1, the first switching element Sw1, and the third switching element S1 is canceled out by a ripple component included in a current supplied from the bypass circuit B. In this manner, the power factor improving circuits 9100 and 9200 reduce the above triangular-wave-shaped ripples flowing out toward the AC power supply 1 as a normal mode noise.

The frequency of a ripple component to be canceled out can be adjusted properly depending on constants of electrical elements included in the bypass circuit B. For example, a case is assumed where a ripple component with a frequency equal to the switching frequency fsw of the first switching element Sw1 is canceled out. In this case, a current flowing through the bypass capacitor Cb1, the current having a frequency equal to the switching frequency fsw, needs to match a current flowing through the first reactor Lr1, the current having a frequency equal to the switching frequency fsw. Specifically, the following formula (2) needs to be satisfied.

[Mathematical Formula 1]

$$f_{sw} = \frac{1}{2\pi\sqrt{C_b(L_c + L_e - k\sqrt{L_rL_c})}} \qquad (2)$$

In the formula (2), the left side expresses the frequency of the ripple component to be canceled out. In this specific example, the frequency of the ripple component to be canceled out is the switching frequency fsw. Cb denotes the capacitance of the bypass capacitor Cb1. Lr denotes the inductance of the first reactor Lr1. Lc denotes the inductance of the first inductor Lc1. Le denotes the inductance of the bypass inductor Le1. The power factor improving circuit 9100 does not include the bypass inductor Le1. Therefore, when the bypass circuit B of the power factor improving circuit 9100 is configured, Le=0 in the formula (2). Also, k denotes a coupling factor for the magnetic coupling between the first reactor Lr1 and the first inductor Lc1.

As described above, according to the power factor improving circuits 9100 and 9200, when the bypass circuit B is configured using electrical elements that satisfy the formula (2), a noise with a frequency equal to the switching frequency fsw can be reduced. However, noises with other frequencies cannot be reduced sufficiently.

Based on the above knowledge, the present inventors have devised configurations disclosed herein.

Solving the Problem

A power supply circuit according to one aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lc2); and a bypass capacitor (Cb1). In the power supply circuit, the first input terminal (3a) is connected to a first end of the first reactor (Lr1), a second end of the first reactor (Lr1) is connected to a first end of the third switching element (S1), and a second end of the third switching element (S1) is connected to the first output terminal (5a), the first input terminal (3a) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to the second end of the first reactor (Lr1), and a second end of the first switching element (Sw1) is connected to the second output terminal (5b), a first end of the second switching element (Sw2) is connected to the second end of the second reactor (Lr2), and a second end of the second switching element (Sw2) is connected to the second output terminal (5b), a first end of the first capacitor (C1) is connected to the first output terminal (5a), and a second end of the first capacitor (C1) is connected to the second output terminal (5b), a first end of the first inductor (Lc1) is connected to the first input terminal (3a), a second end of the first inductor (Lc1) is connected to a first end of the second inductor (Lc2), a second end of the second inductor (Lc2) is connected to a first end of the bypass capacitor (Cb1), and a second end of the bypass capacitor (Cb1) is connected to the second output terminal (5b), the first reactor (Lr1) and the first inductor (Lc1) are magnetically coupled to each other, and the second reactor (Lr2) and the second inductor (Lc2) are magnetically coupled to each other, and the control circuit (9) performs switching control over the first switching element (Sw1) and the second switching element (Sw2), using an interleaving method.

In the above aspect, the power supply circuit may further include a bypass inductor (Le1), in which a series circuit having the first inductor (Lc1), the second inductor (Lc2), and the bypass inductor (Le1) that are connected in series may be disposed between the first input terminal (3a) and the first end of the bypass capacitor (Cb1).

In the above aspect, the power supply circuit may further include a bypass inductor (Le1), and the bypass inductor (Le1) may be disposed between the second end of the second inductor (Lc2) and the first end of the bypass capacitor (Cb1).

In each of the aspects of the present disclosure described above, the power supply circuit may further include a current sensor (91). The current sensor (91) may detect the sum of a current value for a current flowing from the first end of the first reactor (Lr1) to the first input terminal (3a), a current value for a current flowing from the first end of the second reactor (Lr2) to the first input terminal (3a), and a current value for a current flowing from the first end of the first inductor (Lel) to the first input terminal (3a). The control circuit (9) may adjust a switching frequency (fsw) and a duty ratio of each of the first switching element (Sw1) and the second switching element (Sw2) in such a way as to minimize the sum detected by the current sensor (91).

Each of embodiments described below is a specific example of the present disclosure. Numerical values, shapes, constituent elements, and the like are described in the following embodiments as examples, and are not intended for limiting the present disclosure. Among constituent elements included in the following embodiments, constituent elements not described in independent claims expressing the most superior concepts of the present disclosure will be described as optional constituent elements. Respective contents of all the embodiments may be combined with each other.

First Embodiment

Figure 1:
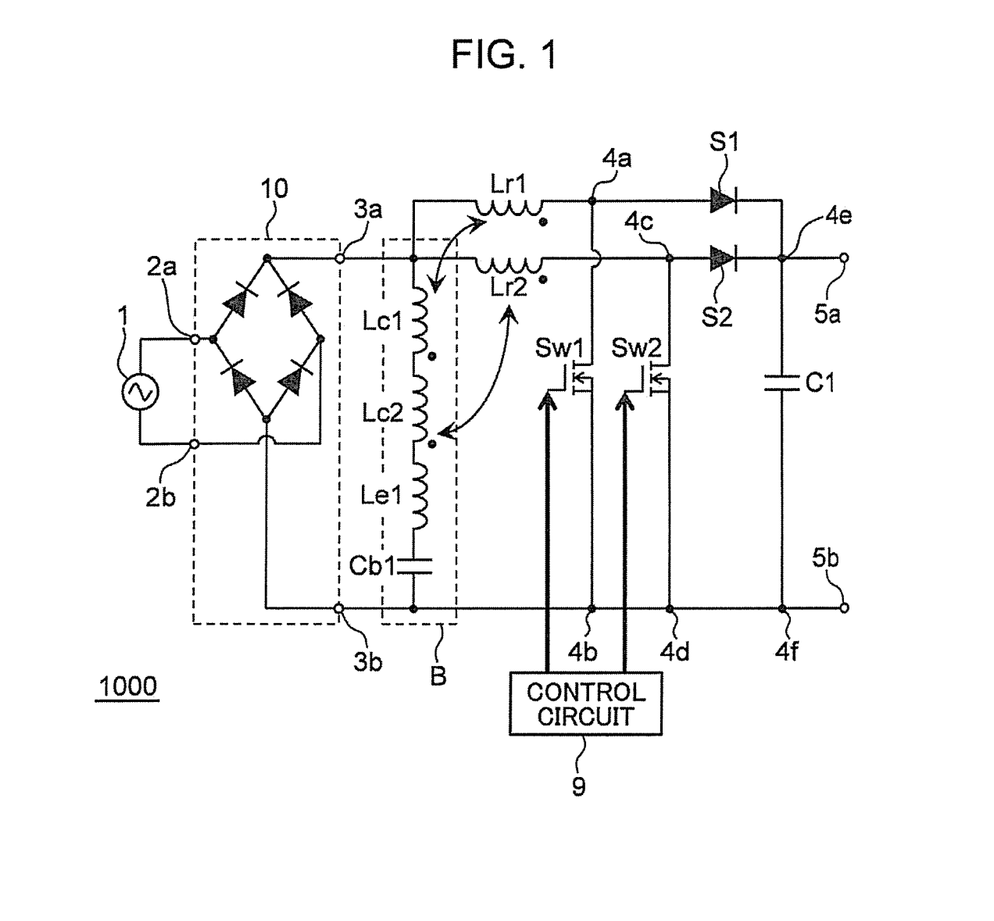
FIG. 1 is a circuit diagram showing a schematic configuration of a power supply circuit according to a first embodiment.

A first embodiment of the present disclosure will hereinafter be described. The same constituent elements as described above will be denoted by the same reference signs, and redundant description will be omitted as necessary. FIG. 1 is a circuit diagram showing a schematic configuration of a power factor improving circuit 1000 according to the first embodiment.

As shown in FIG. 1, the power factor improving circuit 1000 (an example of the power supply circuit) includes a first input terminal 3a, a second input terminal 3b, a first reactor Lr1, a second reactor Lr2, a first switching element Sw1, a second switching element Sw2, a third switching element S1, a fourth switching element S2, a first capacitor C1, a first output terminal 5a, a second output terminal 5b, a control circuit 9, and a bypass circuit B. The bypass circuit B has a first inductor Lc1, a second inductor Lc2, a bypass inductor Le1, and a bypass capacitor Cb1.

According to the power factor improving circuit 1000, the first input terminal 3a is connected to a first end of the first reactor Lr1. A second end of the first reactor Lr1 is connected to a first end of the third switching element S1. A second end of the third switching element S1 is connected to the first output terminal 5a.

The first input terminal 3a is connected to a first end of the second reactor Lr2. A second end of the second reactor Lr2 is connected to a first end of the fourth switching element S2. A second end of the fourth switching element S2 is connected to a connection point 4e on a path linking the second end of the third switching element S1 to the first output terminal 5a. As a result, the second end of the fourth switching element S2 is connected to the first output terminal 5a.

The third switching element S1 and the fourth switching element S2 are each configured by, for example, a diode. The configuration of the third switching element Si and of the fourth switching element S2 is, however, not limited to this. The third switching element S1 and the fourth switching element S2 may be each configured by a generally known switching element, such as a transistor (e.g., MOSFET or IGBT).

According to the power factor improving circuit 1000, the second input terminal 3b is connected to the second output terminal 5b.

A first end of the first switching element Sw1 is connected to a connection point 4a on a path linking the second end of the first reactor Lr1 to the first end of the third switching element S1. As a result, the first end of the first switching element Sw1 is connected to the second end of the first reactor Lr1. A second end of the first switching element Sw1 is connected to a connection point 4b on a path linking the second input terminal 3b to the second output terminal 5b. As a result, the second end of the first switching element Sw1 is connected to the second output terminal 5b.

A first end of the second switching element Sw2 is connected to a connection point 4c on a path linking the second end of the second reactor Lr2 to the first end of the fourth switching element S2. As a result, the first end of the second switching element Sw2 is connected to the second end of the second reactor Lr2. A second end of the second switching element Sw2 is connected to a connection point 4d on the path linking the second input terminal 3b to the second output terminal 5b. As a result, the second end of the second switching element Sw2 is connected to the second output terminal 5b.

The first switching element Sw1 and the second switching element Sw2 are each configured by, for example, a generally known switching element, such as a transistor (e.g., MOSFET or IGBT).

A first end of the first capacitor C1 is connected to the connection point 4e, while a second end of the first capacitor C1 is connected to a connection point 4f on the path linking the second input terminal 3b to the second output terminal 5b. As a result, the first end of the first capacitor C1 is connected to the first output terminal 5a, while the second end of the first capacitor C1 is connected to the second output terminal 5b.

A first end of the first inductor Lc1 is connected to the first input terminal 3a. A second end of the first inductor Lc1 is connected to a first end of the second inductor Lc2. A second end of the second inductor Lc2 is connected to a first end of the bypass inductor Le1. A second end of the bypass inductor Le1 is connected to a first end of the bypass capacitor Cb1. In other words, the bypass inductor Le1 is disposed between the second end of the second inductor Lc2 and the first end of the bypass capacitor Cb1. Hence the second end of the second inductor Lc2 is connected to the first end of the bypass capacitor Cb1 via the bypass inductor Le1. A second end of the bypass capacitor Cb1 is connected to the second output terminal 5b.

The first reactor Lr1 and the first inductor Le1 are magnetically coupled such that the second end of the first reactor Lr1 and the second end of the first inductor Le1 have the same polarity. The second reactor Lr2 and the second inductor Lc2 are magnetically coupled such that the second end of the second reactor Lr2 and the second end of the second inductor Lc2 have the same polarity.

The control circuit 9 performs switching control over the first switching element Sw1 and the second switching element Sw2, using the interleaving method. As a result, the first switching element Sw1, the second switching element Sw2, the third switching element S1, and the fourth switching element S2 carry out interleaving operations.

According to the configuration of the first embodiment, the first switching element Sw1 and the second switching element Sw2 are subjected to switching control by the control circuit 9 using the interleaving method. As a result, out of frequency components included in triangular-wave-shaped ripples generated by switching actions of the first switching element Sw1 and the second switching element Sw2, frequency components equal to odd multiples of the switching frequency fsw can be canceled out. Hence propagation of a normal mode noise with frequency components equal to odd multiples of the switching frequency fsw to the AC power supply 1 or the like via the first input terminal 3a and the second input terminal 3b can be suppressed.

Because the first reactor Lr1 and the first inductor Lc1 are magnetically coupled to each other and the second reactor Lr2 and the second inductor Lc2 are magnetically coupled to each other, a current flowing through the first reactor Lr1 and a current flowing through the second reactor Lr2 excite a voltage across both terminals of the bypass capacitor Cb1, thus causing the voltage to oscillate. As a result, a ripple component with a predetermined frequency included in the sum of the current flowing through the first reactor Lr1 and the current flowing through the second reactor Lr2 is supplied from the bypass capacitor Cb1. This cancels out a ripple component with the predetermined frequency included in the sum of a current flowing through at least one of the first reactor Lr1, the first switching element Sw1, and the third switching element S1 and a current flowing through at least one of the second reactor Lr2, the second switching element Sw2, and the fourth switching element S2.

In this manner, according to the configuration of the first embodiment, not only the ripple components with frequencies equal to odd multiples of the switching frequency fsw but also, for example, a ripple component with a frequency two times the switching frequency fsw, both ripple components flowing out via the first input terminal 3a and the second input terminal 3b as a normal mode noise, can be reduced. Thus, compared with the power factor improving circuit 9000 (FIG. 6) that performs switching control using the conventional interleaving method, normal mode noises can be further reduced.

The frequency of a ripple component to be canceled out can be adjusted properly depending on constants of electrical elements included in the bypass circuit B. For example, a case is assumed where a ripple component with the frequency 2fsw, which is two times the switching frequency fsw, is canceled out. In this case, a current component flowing through the bypass capacitor Cb1, the current component having the frequency 2fsw, needs to match the sum of a current component flowing through the first reactor Lr1, the current component having the frequency 2fsw, and a current component flowing through the second reactor Lr2, the current component having the frequency 2fsw. Specifically, the following formula (1) needs to be satisfied.

[Mathematical Formula 2]

$$2f_{sw} = \frac{1}{2\pi\sqrt{C_b(2L_c + 2L_e - k\sqrt{L_r L_c})}} \quad (1)$$

In the formula (1), the left side expresses the frequency of the ripple component to be canceled out. In this specific example, the frequency of the ripple component to be canceled out is the frequency 2fsw that is two times the switching frequency fsw. Cb denotes the capacitance of the bypass capacitor Cb1. Lr denotes the inductance of the first reactor Lr1 and of the second reactor Lr2. Lc denotes the inductance of the first inductor Lc1 and of the second inductor Lc2. Le denotes the inductance of the bypass inductor Le1. Also, k denotes a coupling factor for the magnetic coupling between the first reactor Lr1 and the first inductor Lc1 and for the magnetic coupling between the second reactor Lr2 and the second inductor Lc2.

Thus, when the bypass circuit B is configured using electrical elements that satisfy the formula (1), the power factor improving circuit 1000 (which will hereinafter be referred to as "the power factor improving circuit 1000 that satisfies the formula (1)") can reduce ripple components with frequencies equal to odd multiples of the switching frequency fsw and a ripple component with a frequency two times the switching frequency fsw.

Figure 2:
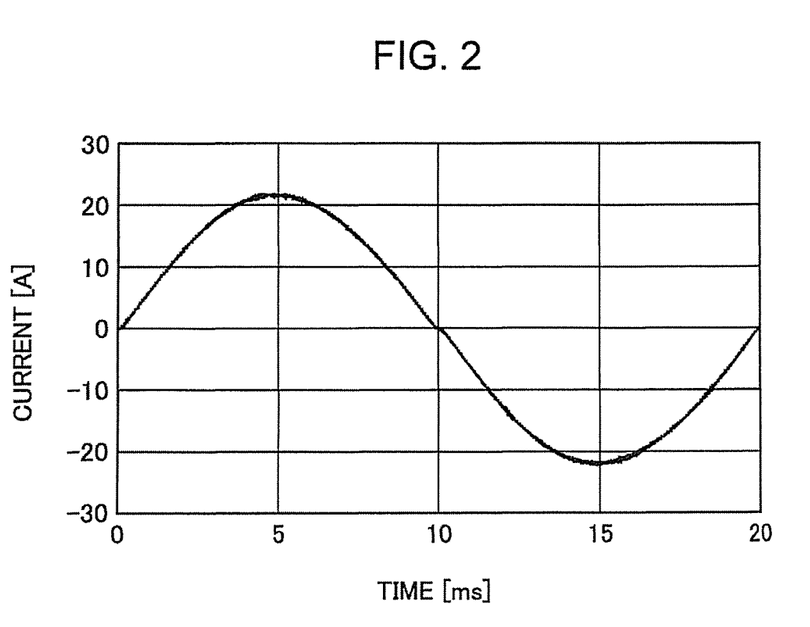
FIG. 2 is a graph showing a calculation result obtained by a circuit simulation of a power current in a power factor improving circuit that satisfies a formula (1).

FIG. 2 shows a calculation result obtained by a circuit simulation of a power current in the power factor improving circuit 1000 that satisfies the formula (1). A segment of a power current waveform shown in FIG. 2, the segment in a period from time 5 ms to time 5.1 ms, is extracted and shown in an enlarged form in FIG. 3.

In this circuit simulation, similarly to the circuit simulation of the power factor improving circuit 9000 (FIG. 6) in the comparative example described above, the inductance Lr of the first reactor Lr1 and of the second reactor Lr2 is determined to be 200 uH, and the switching frequency fsw is determined to be 100 kHz. The frequency and the effective value of an AC voltage supplied from the AC power supply 1 are determined to be 50 Hz and 200 V, respectively. The DC voltage that develops between the first output terminal 5a and the second output terminal 5b is determined to be 400 V.

To satisfy the formula (1), the capacitance Cb of the bypass capacitor Cb1 is determined to be 400 nF. The inductance Lc of the first inductor Lc1 and of the second inductor Lc2 is determined to be 2. The inductance Le of the bypass inductor Le1 is determined to be 16.6 µH. The coupling factor k for the magnetic coupling between the first reactor Lr1 and the first inductor Lc1 and for the magnetic coupling between the second reactor Lr2 and the second inductor Lc2 is determined to be 0.95.

Figure 3:
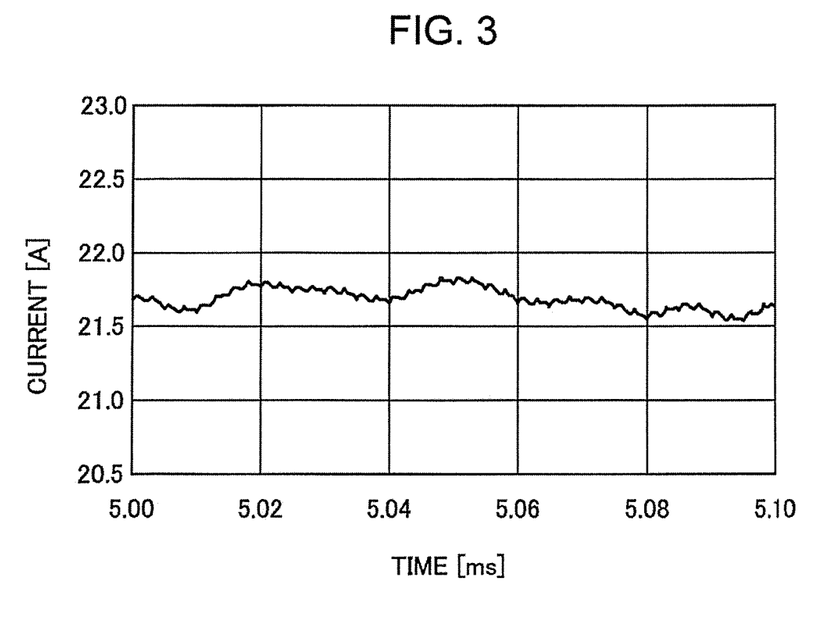
FIG. 3 is a graph showing an enlarged view of a segment of a power current waveform shown in FIG. 2, the segment being in a specific period.

The power factor improving circuit 1000 that satisfies the formula (1) can reduce ripple components with frequencies equal to one time and two times the switching frequency fsw and to odd multiples of the switching frequency fsw, i.e., three times or more the switching frequency fsw. In other words, the power factor improving circuit 1000 can reduce a ripple component with a frequency two times the switching frequency fsw, the ripple component being hardly reduced by an X capacitor because of its small capacitance, more effectively than the above power factor improving circuit 9000 (FIG. 6) in the comparative example. As a result, as shown in FIG. 2, the power current waveform generated by the power factor improving circuit 1000 has less noise components superimposed on the waveform than the power current waveform shown in FIG. 7 that is generated by the power factor improving circuit 9000 (FIG. 6). In addition, as shown in FIG. 3, as a result of effective reduction in the ripple component with the frequency two times the switching frequency fsw, the power current waveform generated by the power factor improving circuit 1000 has an amplitude smaller than that of the power current waveform shown in FIG. 7 that is generated by the power factor improving circuit 9000 (FIG. 6).

Further, the configuration of the first embodiment can be achieved merely by adding the bypass circuit B made up of small electrical elements to the power factor improving circuit 9000 (FIG. 6) that uses the conventional interleaving method, without adding electrical elements to a power current supply path linking the first input terminal 3a to the first output terminal 5a.

The configuration of the first embodiment is more advantageous in the following respects than a configuration in which, for example, a first modified bypass circuit created by removing the second inductor Lc2 from the bypass circuit B and a second modified bypass circuit created by removing the first inductor Lc1 from the bypass circuit B are connected in parallel with each other (this configuration will hereinafter be referred to as "comparative configuration").

In the comparative configuration, the first modified bypass circuit and the second modified bypass circuit include four inductors in total. In the configuration of the first embodiment, on the other hand, the bypass circuit B includes only three inductors. In the comparative configuration, the first modified bypass circuit and the second modified bypass circuit include two capacitors in total. In the configuration of the first embodiment, on the other hand, the bypass circuit B includes only one capacitor.

This demonstrates a fact that the configuration of the first embodiment is more advantageous than the comparative configuration in that the bypass circuit can be formed of fewer electrical elements, thus requiring less cost. In addition, the configuration of the first embodiment includes fewer inductors, whose constants vary greatly inductor by inductor, than the comparative configuration. This makes the configuration of the first embodiment more advantageous than the comparative configuration in that an intended noise reduction effect is achieved more easily in the configuration of the first embodiment than in the comparative configuration and that cost required for acquiring inductors having an intended constant can be reduced.

Because the first modified bypass circuit and the second modified bypass circuit are connected in parallel with each other in the comparative configuration, a current path in which a current leaves the first input terminal 3a, flows through the first modified bypass circuit and the second modified bypass circuit, and returns to the first input terminal 3a is formed in the comparative configuration.

In the configuration of the first embodiment, in contrast, the first input terminal 3a is connected to the first end of the inductor Lc1, the first end being one end of the bypass circuit B, and the second input terminal 3b is connected to the second end of the bypass capacitor Cb1, the second end being another end of the bypass circuit B. In addition, in the bypass circuit B, the first inductor Lc1, the second inductor Lc2, the bypass inductor Le1, and the bypass capacitor Cb1 are connected in series.

Because of this layout, a current path through which a current leaves the first input terminal 3a, flows through the bypass circuit B, to return to the first input terminal 3a is not formed. This prevents a case where a resonance current with a large current value flows through each of the elements included in the bypass circuit. As a result, the first inductor Lc1, the second inductor Lc2, the bypass inductor Le1, and the bypass capacitor Cb1, which form the bypass circuit B, can be provided as small-sized components with small current ratings, which allows miniaturization of the power supply circuit.

According to the configuration of the first embodiment, even if the coupling factor for the magnetic coupling between the first reactor Lr1 and the first inductor Lc1 is close to 1, a coupling factor for magnetic coupling between the first reactor Lr1 and a combined inductor created by combining together the first inductor Lc1, the second inductor Lc2, and the bypass inductor Le1 is considered to be small from the viewpoint of equivalency between both coupling factors. Likewise, even if the coupling factor for the magnetic coupling between the second reactor Lr2 and the second inductor Lc2 is close to 1, a coupling factor for magnetic coupling between the second reactor Lr2 and the combined inductor created by combining together the first inductor Lc1, the second inductor Lc2, and the bypass inductor Le1 is considered to be small from the viewpoint of equivalency between both coupling factors.

For this reason, a desired coupling factor can be obtained easily by adjusting the inductance of the bypass inductor Le1, without changing the shape of a core used for the magnetic coupling between the first reactor Lr1 and the first inductor Lc1 and the shape of a core used for the magnetic coupling between the second reactor Lr2 and the second inductor Lc2.

Using a large core having branch magnetic paths, such as an EI core and an EE core, to obtain a desired coupling factor, therefore, can be avoided. Hence the power factor improving circuit can be miniaturized.

First Modification of First Embodiment

Figure 4:
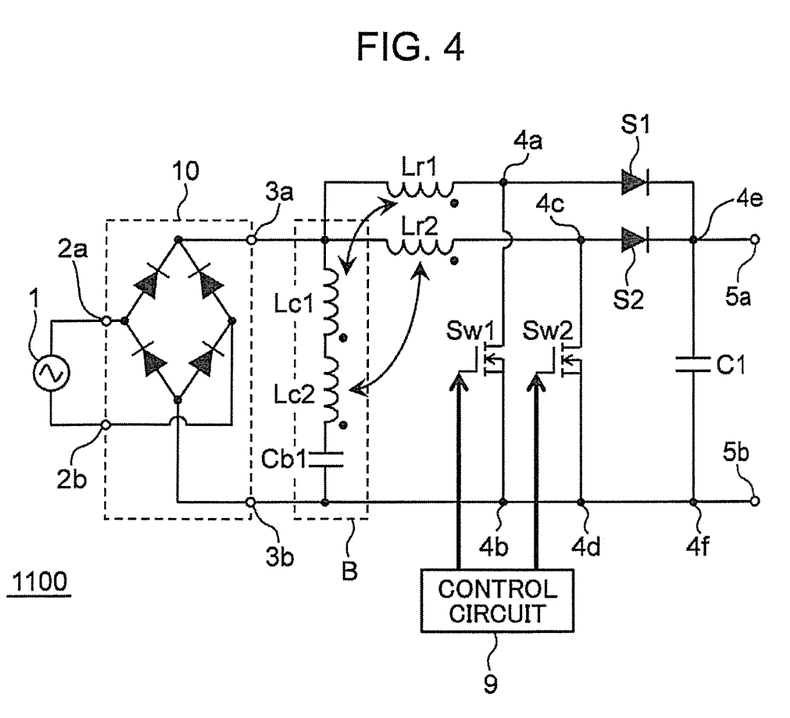
FIG. 4 is a circuit diagram showing a schematic configuration of a power factor improving circuit in a first modification of the first embodiment.

A first modification of the first embodiment will hereinafter be described. Description overlapping the above description will be omitted as necessary. FIG. 4 is a circuit diagram showing a schematic configuration of a power factor improving circuit 1100 in the first modification of the first embodiment.

As shown in FIG. 4, the power factor improving circuit 1100 is different from the power factor improving circuit 1000 (FIG. 1) in that the power factor improving circuit 1100 does not include the bypass inductor Le1.

This configuration, similarly to the configuration of the first embodiment, reduces triangular-wave-shaped ripples including ripple components with frequencies equal to odd multiples of the switching frequency fsw and a ripple component with a predetermined frequency, both ripple components flowing out toward the AC power supply 1 side as a normal mode noise.

Second Modification of First Embodiment

Figure 5:
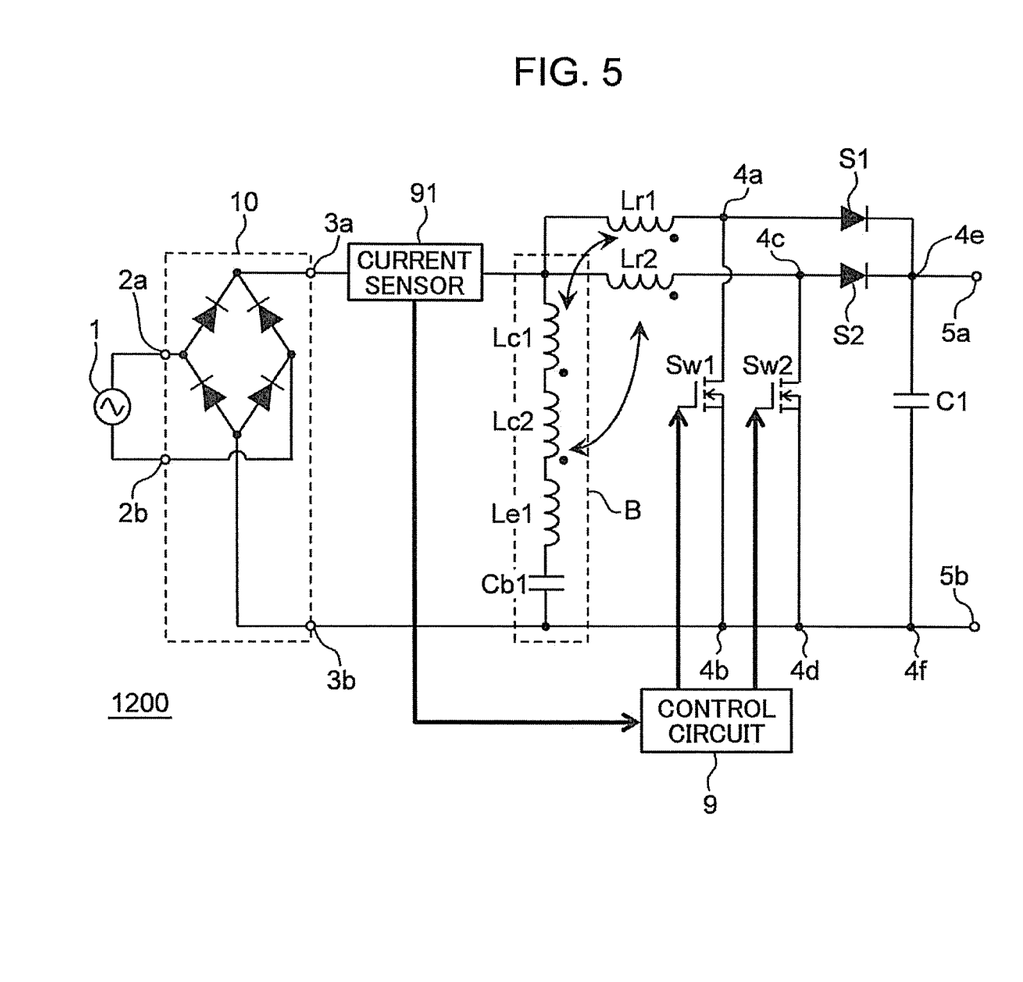
FIG. 5 is a circuit diagram showing a schematic configuration of a power factor improving circuit in a second modification of the first embodiment.

A second modification of the first embodiment will hereinafter be described. Description overlapping the above description will be omitted as necessary. FIG. 5 is a circuit diagram showing a schematic configuration of a power factor improving circuit 1200 in the second modification of the first embodiment.

As shown in FIG. 5, the power factor improving circuit 1200 is different from the power factor improving circuit 1000 (FIG. 1) in that the power factor improving circuit 1200 further includes a current sensor 91.

The current sensor 91 detects the sum of a current value for a current flowing from the first end of the first reactor Lr1 to the first input terminal 3a, a current value for a current flowing from the first end of the second reactor Lr2 to the first input terminal 3a, and a current value for a current flowing from the first end of the first inductor Lc1 to the first input terminal 3a. The current sensor 91 outputs the detected sum to the control circuit 9.

The control circuit 9 adjusts the switching frequency fsw and the duty ratio of each of the first switching element Sw1 and the second switching element Sw2 in such a way as to minimize predetermined frequency components included in the sum detected by the current sensor 91. The switching frequency fsw and the duty ratio may be adjusted properly by a known method.

A predetermined frequency may be determined to be a frequency expressed as the product of the switching frequency fsw and the number of switching elements subjected to switching control by the control circuit 9 using the interleaving method. For example, in this modification, the control circuit 9 performs switching control over two switching elements, i.e., the first switching element Sw1 and the second switching element Sw2, using the interleaving method. The predetermined frequency is thus determined to be the frequency 2fsw, which is two times the switching frequency fsw. In this case, the control circuit 9 adjusts the switching frequency fsw and the duty ratio of each of the first switching element Sw1 and the second switching element Sw2 in such a way as to minimize each of frequency components included in the sum detected by the current sensor 91, the frequency components each being two times the switching frequency fsw.

According to this configuration, the current sensor 91 detects the sum of the current values for currents flowing from the first end of the first reactor Lr1, the first end of the second reactor Lr2, and the first end of the first inductor Lc1 respectively to the first input terminal 3a. In other words, a current value for a noise current that has not been reduced through the bypass circuit B, the noise current being included in noise currents flowing from the first end of the first reactor Lr1 and the first end of the second reactor Lr2, respectively, to the first input terminal 3a, is detected as the above sum. To minimize the predetermined frequency components included in the detected sum, the control circuit 9 adjusts the switching frequency fsw and the duty ratio of each of the first switching element Sw1 and the second switching element Sw2.

Therefore, even if constants of electrical elements constituting the power factor improving circuit vary to provide a circuit configuration in which noise currents flowing from the first ends of the first and second reactors Lr1 and Lr2 to the first input terminal 3a cannot be reduced sufficiently, the above adjustment by the control circuit 9 can minimize the noise currents.

The power factor improving circuit 1100 (FIG. 4) may further include the current sensor 91, similarly to the power factor improving circuit 1200. In the power factor improving circuit 1100, the control circuit 9 may adjust the switching frequency fsw and the duty ratio of each of the first switching element Sw1 and the second switching element Sw2 in such a way as to minimize the predetermined frequency components included in the sum detected by the current sensor 91.

The current sensor 91 may be connected in series to the bypass capacitor Cb1. In this case, the control circuit 9 adjusts the switching frequency fsw and the duty ratio of each of the first switching element Sw1 and the second switching element Sw2 in such a way as to maximize the predetermined frequency components included in the sum detected by the current sensor 91.

The current sensor 91 may be connected in series to the first switching element Sw1, and a current sensor different from the current sensor 91 may be connected in series to the second switching element Sw2. In this case, the control circuit 9 adjusts the switching frequency fsw and the duty ratio of each of the first switching element Sw1 and the second switching element Sw2 such that predetermined frequency components included in current values detected by the above two current sensors become equal with each other.

The power factor improving circuit 1000 (FIG. 1) according to the first embodiment may be modified to have a configuration in which a series circuit constructed by connecting the first inductor Lc1, the second inductor Lc2, and the bypass inductor Le1 in series is disposed between the first input terminal 3a and the first end of the bypass capacitor Cb1.

Specifically, a series circuit may be constructed in which the second end of the bypass inductor Le1 is connected to the first end of the first inductor Lc1 and the second end of the first inductor Lc1 is connected to the first end of the second inductor Lc2. By connecting the first end of the bypass inductor Le1 to the first input terminal 3a and connecting the second end of the second inductor Lc2 to the first end of the bypass capacitor Cb1, the series circuit may be disposed between the first input terminal 3a and the first end of the bypass capacitor Cb1.

Alternatively, a series circuit may be constructed in which the second end of the first inductor Le1 is connected to the first end of the bypass inductor Le1 and the second end of the bypass inductor Le1 is connected to the first end of the second inductor Lc2. By connecting the first end of the first inductor Lc1 to the first input terminal 3a and connecting the second end of the second inductor Lc2 to the first end of the bypass capacitor Cb1, the series circuit may be disposed between the first input terminal 3a and the first end of the bypass capacitor Cb1.

Alternatively, a series circuit may be constructed in which the second end of the first inductor Le1 is connected to the first end of the first bypass inductor Le1 and the second end of the first bypass inductor Le1 is connected to the first end of the second inductor Lc2. By connecting the first end of the first inductor Le1 to the first input terminal 3a and connecting the second end of the second inductor Lc2 to the first end of the bypass capacitor Cb1, the series circuit may be disposed between the first input terminal 3a and the first end of the bypass capacitor Cb1.

This modified configuration of the power factor improving circuit 1000 (FIG. 1) can achieve the same effect as in the configuration of the power factor improving circuit 1000 (FIG. 1).

Further, the modified configuration of the power factor improving circuit 1000 (FIG. 1) may further include the current sensor 91, similarly to the power factor improving circuit 1200 (FIG. 5). In the modified configuration of the power factor improving circuit 1000 (FIG. 1), the control circuit 9 may adjust the switching frequency fsw and the duty ratio of each of the first switching element Sw1 and the second switching element Sw2 in such a way as to minimize predetermined frequency components included in the sum detected by the current sensor 91.

The current sensor 91 may be connected in series to the bypass capacitor Cb1. In this case, the control circuit 9 adjusts the switching frequency fsw and the duty ratio of each of the first switching element Sw1 and the second switching element Sw2 in such a way as to maximize the predetermined frequency components included in the sum detected by the current sensor 91.

Alternatively, the current sensor 91 may be connected in series to the first switching element Sw1, and a current sensor different from the current sensor 91 may be connected in series to the second switching element Sw2. In this case, the control circuit 9 adjusts the switching frequency fsw and the duty ratio of each of the first switching element Sw1 and the second switching element Sw2 such that predetermined frequency components included in current values detected by the above two current sensors become equal with each other.

The configurations of the first embodiment and the modifications thereof raise a concern that while a ripple component with a frequency two times the switching frequency fsw is reduced by the bypass circuit B, ripple components with frequencies equal to even multiples of the switching frequency fsw and to four times or more the switching frequency fsw may not be reduced sufficiently and, consequently, propagate as a normal mode noise to cause malfunctioning of peripheral circuits. To eliminate this concern, in the configurations of the first embodiment and the modifications thereof, the control circuit 9 may perform so-called frequency spread control to also reduce ripple components with frequencies equal to even multiples of the switching frequency fsw and to four times or more the switching frequency fsw.

In the above configurations, the rectifying section 10 is provided as a diode bridge circuit having four diodes. The configuration of the rectifying section 10 is, however, not limited to this. The rectifying section 10 may be provided as a bridgeless circuit or a totem pole circuit. In the above configurations, the AC power supply 1 and the rectifying section 10 may be replaced with a chopper circuit constructed by connecting a DC power supply to the first input terminal 3a and to the second input terminal 3b.

In the above embodiments, "connection between two elements" (e.g., connection of a certain element to a different element) may refer not only to direct physical connection but also to electrical connection and to connection between two elements across a different element interposed therebetween, the different element being, for example, a wiring line, a resistance element, or the like that does not impair the functions of the embodiments.

The invention claimed is:

1. A power supply circuit comprising:
a first input terminal which is connected to an AC power supply via a rectifying section, the first input terminal directly connected to the rectifying section;
a second input terminal which is connected to the AC power supply via the rectifying section, the second input terminal directly connected to the rectifying section;
a first reactor;
a second reactor;
a first switching element;
a second switching element;
a third switching element;
a fourth switching element;
a first capacitor;
a first output terminal;
a second output terminal;
a control circuit;
a first inductor;
a second inductor; and
a bypass capacitor,
wherein the first input terminal is connected to a first end of the first reactor, a second end of the first reactor is connected to a first end of the third switching element, and a second end of the third switching element is connected to the first output terminal,
the first input terminal is connected to a first end of the second reactor, a second end of the second reactor is connected to a first end of the fourth switching element, and a second end of the fourth switching element is connected to the first output terminal,
the second input terminal is connected to the second output terminal,
a first end of the first switching element is connected to the second end of the first reactor, and a second end of the first switching element is connected to the second output terminal,
a first end of the second switching element is connected to the second end of the second reactor, and a second end of the second switching element is connected to the second output terminal,
a first end of the first capacitor is connected to the first output terminal, and a second end of the first capacitor is connected to the second output terminal,
a first end of the first inductor is connected to the first input terminal, a second end of the first inductor is connected to a first end of the second inductor, a second end of the second inductor is connected to a first end of the bypass capacitor, and a second end of the bypass capacitor is connected to the second output terminal,
the first reactor and the first inductor are magnetically coupled to each other, and the second reactor and the second inductor are magnetically coupled to each other, and
the control circuit performs switching control over the first switching element and the second switching element, using an interleaving method.

2. The power supply circuit according to claim 1, further comprising a bypass inductor,
wherein a series circuit having the first inductor, the second inductor, and the bypass inductor that are connected in series is disposed between the first input terminal and the first end of the bypass capacitor.

3. The power supply circuit according to claim 1, further comprising a bypass inductor,
wherein the bypass inductor is disposed between the second end of the second inductor and the first end of the bypass capacitor.

4. The power supply circuit according to claim 1, further comprising a current sensor,
wherein the current sensor detects a sum of a current value for a current flowing from the first end of the first reactor to the first input terminal, a current value for a current flowing from the first end of the second reactor to the first input terminal, and a current value for a current flowing from the first end of the first inductor to the first input terminal, and
the control circuit adjusts a switching frequency and a duty ratio of each of the first switching element and the second switching element in such a way as to minimize a predetermined frequency component included in the sum detected by the current sensor.

* * * * *